United States Patent [19]

Haynam et al.

[11] Patent Number: 5,443,702

[45] Date of Patent: Aug. 22, 1995

[54] LASER ISOTOPE SEPARATION OF ERBIUM AND OTHER ISOTOPES

[76] Inventors: Christopher A. Haynam, 3035 Ferdale Ct., Pleasanton, Calif. 94566; Earl F. Worden, 117 Vereda del Ciervo, Diablo, Calif. 94528

[21] Appl. No.: 79,583

[22] Filed: Jun. 22, 1993

[51] Int. Cl.[6] .................................................. B01D 5/00
[52] U.S. Cl. .......................... 204/157.22; 204/157.2; 376/189; 376/419; 252/636
[58] Field of Search .............. 376/170, 184, 189, 419; 204/157.2, 157.22; 252/636

[56] References Cited

U.S. PATENT DOCUMENTS

| | | | |
|---|---|---|---|
| 3,708,392 | 1/1973 | Campbell | 376/170 |
| 3,764,807 | 10/1973 | Pollack | 250/330 |
| 4,105,921 | 8/1978 | Bartlett et al. | 250/423 P |
| 4,173,738 | 11/1979 | Bolina et al. | 330/4.3 |
| 4,233,570 | 11/1980 | Emmett et al. | 331/94.5 F |
| 4,336,230 | 6/1982 | Bethe et al. | 423/3 |
| 4,419,582 | 12/1983 | Janes et al. | 250/424 |
| 4,793,907 | 12/1988 | Paisner et al. | 204/157.21 |
| 5,202,005 | 4/1993 | Paisner et al. | 204/157.22 |
| 5,250,231 | 10/1993 | Grossman et al. | 252/636 |
| 5,267,284 | 11/1993 | Grossman | 376/339 |
| 5,267,290 | 11/1993 | Corsetti et al. | 376/419 |
| 5,316,635 | 5/1994 | Green et al. | 295/157.22 |

OTHER PUBLICATIONS

"Pulsed single-mode laser ionization of hyperfine levels of zirconium-91" by P. A. Hackett, H. D. Morrison, O. L. Bourne, B. Simard, D. M. Rayner, *J. Opt. Soc. Am.*, B5, No. 12, pp. 2409–2416 (Dec. 1988).

"Laser Isotope Separation of Zirconium Atoms Cooled in a Supersonic Beam" by M. R. Humphries, O. L. Bourne, and P. A. Hackett, *Chem. Phys. Lett.*, vol. 118, No. 2, pp. 134–139 (Jul. 1985).

"Progress in zirconium resonance ionization spectroscopy" by R. H. Page, S. C. Dropinski, E. F. Worden, and J. A. D. Stockdale, UCRL-JC-112518 (Jan. 1993).

*Primary Examiner*—Donald P. Walsh
*Assistant Examiner*—Meena Chelliah
*Attorney, Agent, or Firm*—Daryl Grzybicki; William C. Daubenspeck; William R. Moser

[57] ABSTRACT

Laser isotope separation is accomplished using at least two photoionization pathways of an isotope simultaneously, where each pathway comprises two or more transition steps. This separation method has been applied to the selective photoionization of erbium isotopes, particularly for the enrichment of [167]Er. The hyperfine structure of [167]Er was used to find two three-step photoionization pathways having a common upper energy level.

18 Claims, 3 Drawing Sheets

LASER ISOTOPE SEPARATION OF ERBIUM AND OTHER ISOTOPES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method for atomic vapor laser isotope separation of isotopes using two or more photoionization pathways simultaneously. In particular, the isotope $^{167}$Er can be enriched using two three-step photoionization pathways involving the hyperfine structure of $^{167}$Er.

2. Description of Related Art

Erbium is a naturally-occurring element belonging to the rare-earth or lanthanide series, and is made up of six stable isotopes with natural abundances given in parentheses: $^{162}$Er (0.14%), $^{164}$Er (1.61%), $^{166}$Er (33.6%), $^{167}$Er (22.95%), $^{168}$Er (26.8%), and $^{170}$Er (14.9%). Erbium has nuclear and metallurgical applications, and is used as a dopant in glasses and ceramics. Natural erbium is being developed for use in commercial nuclear reactors, with the isotope $^{167}$Er as the active component. The other erbium isotopes dilute and degrade reactor performance, so enrichment of $^{167}$Er is desirable.

Enrichment of one or more isotopes is achieved through separation processes that take advantage of the minute differences in chemical or physical properties between the isotopes. Isotopic separation on a small scale is performed using a mass spectrometer, but large scale methods include gaseous diffusion, distillation, electrolysis, thermal diffusion, centrifuging, and laser methods. Laser isotope separation of an atomic vapor selectively excites energy states in one or more isotopes (without exciting and ionizing other isotopes), and then the selectively ionized isotopes are separated from the neutral atoms in an electromagnetic field.

Laser isotope separation typically exploits isotope shifts, which are displacements in the spectral lines of isotopes of an element. Uranium-235 separation and enrichment for use in commercial power reactors has been demonstrated with plant-scale hardware using an atomic vapor laser isotope separation (AVLIS) process, where the uranium isotope shifts are about 2 GHz per mass unit. In comparison, isotope shifts are small in erbium: about 0.5 GHz per mass unit. In place of isotope shifts, the present method uses the hyperfine structure (hfs) of $^{167}$Er to isolate energy levels for selective photoionization. Isotope enrichment of the even zirconium isotopes by removing $^{91}$Zr has been proposed using the hyperfine structure of this even-odd isotope (P. A. Hackett, H. D. Morrison, O. L. Bourne, B. Simard, and D. M. Rayher, *J. Opt. Soc. Am.*, B5, pp. 2409–2416 (1988)). Their technique has not been applied to or suggested for erbium isotopes.

Designing a scheme for efficient selective ionization of a desired isotope is not readily apparent, but requires investigation of which atomic transitions to use and the particular sources of photon energy required for overall efficiency of the separation process. The discovery of specific energy levels is critical to determine the proper pathways that result in an efficient, commercially viable photoionization scheme. Successful laser isotope separation of erbium isotopes is dependent on finding effective multiple-step excitation pathways that will enrich the desired isotope, $^{167}$Er. The steps must have a number of spectroscopic properties that cannot be predicted, but need to be determined by laboratory experiment.

One requirement of the photoionization steps is that the frequency separations, or isotope shifts, of the desired isotope, $^{167}$Er, and the even erbium isotopes ($^{162}$Er, $^{164}$Er, $^{166}$Er, $^{168}$Er, and $^{170}$Er) are sufficient to allow selective ionization. In addition, the transition absorption cross-sections for all steps must be of appropriate magnitude. The transition frequencies for all steps preferably fall in the range of efficient dye lasers, such as copper vapor laser pumped dye lasers or Nd:YAG laser pumped dye lasers. Applicants have found that fifty to one hundred percent more $^{167}$Er can be photoionized by the simultaneous use of two separate multiple-step photoionization pathways that have a common upper energy level.

SUMMARY OF THE INVENTION

The invention is a method for separating and enriching a desired isotope in an atomic vapor containing a plurality of isotopes using laser-produced radiant energy to simultaneously excite two or more photoionization pathways of the desired isotope. The present method involves selecting at least two photoionization pathways for a desired isotope, with each pathway comprising two or more steps or transitions. The atomic vapor is exposed to laser beams having energies sufficient to excite atoms of the desired isotope along both pathways, resulting in enhanced separation and yield of the desired isotope.

The invention has been used to separate the isotopes in naturally-occurring erbium to enrich $^{167}$Er using two three-step photoionization pathways. The two pathways share a second step energy level and a third photoionization step. These two pathways use the hyperfine structure of the $^{167}$Er isotope with nuclear spin $I = 7/2$ for isotopically specific excitation and photoionization. Only $^{167}$Er has hyperfine structure; the even erbium isotopes have no nuclear spin and therefore no hyperfine structure. The concept of using two or more excitation pathways to enhance the photoionization efficiency of the AVLIS process is new, as are the ionization pathways described.

In the specific case of erbium, the atomic vapor is exposed to laser radiation sufficient to excite $^{167}$Er atoms along two three-step pathways: a baseline pathway and an alternate pathway. In the baseline pathway, the $^{167}$Er atoms are excited from the ground state to a first excited state. The orbital angular momentum (J) of the ground state has a value of 6, and the first excited state has an energy of 15846 cm$^{-1}$ and J=7. The erbium vapor is also exposed to laser radiation sufficient to excite the $^{167}$Er atoms from the first excited state to a second excited state having an energy of 32884 cm$^{-1}$ and J=8. Finally, the $^{167}$Er atoms are excited from the second excited state to an autoionizing state at 50552 cm$^{-1}$, where J=9. These three transitions can be induced by dye lasers tuned to a wavelength of 6308 Å for the first step, a wavelength of 5867 Å for the second step, and a wavelength of 5658 Å for the third step.

The erbium vapor is excited along the alternate pathway simultaneously. The first step of the alternate pathway is from the ground state to an energy level of 17157 cm$^{-1}$. This transition (J=6→7) to the first excited state is achieved using a dye laser tuned to a wavelength of 5826 Å. The erbium vapor is also irradiated with photons having a wavelength of 6356 Å to reach the second excited state (J=7→8) at 32884 cm$^{-1}$. The baseline and alternate pathways share the third and final transition (J=8→9) to the autoionizing state at 50552 cm$^{-1}$. The transitions in the baseline and alternate schemes lie in the spectral region accessible by copper vapor laser pumped dye lasers.

DETAILED DESCRIPTION OF THE INVENTION

Figure 1:
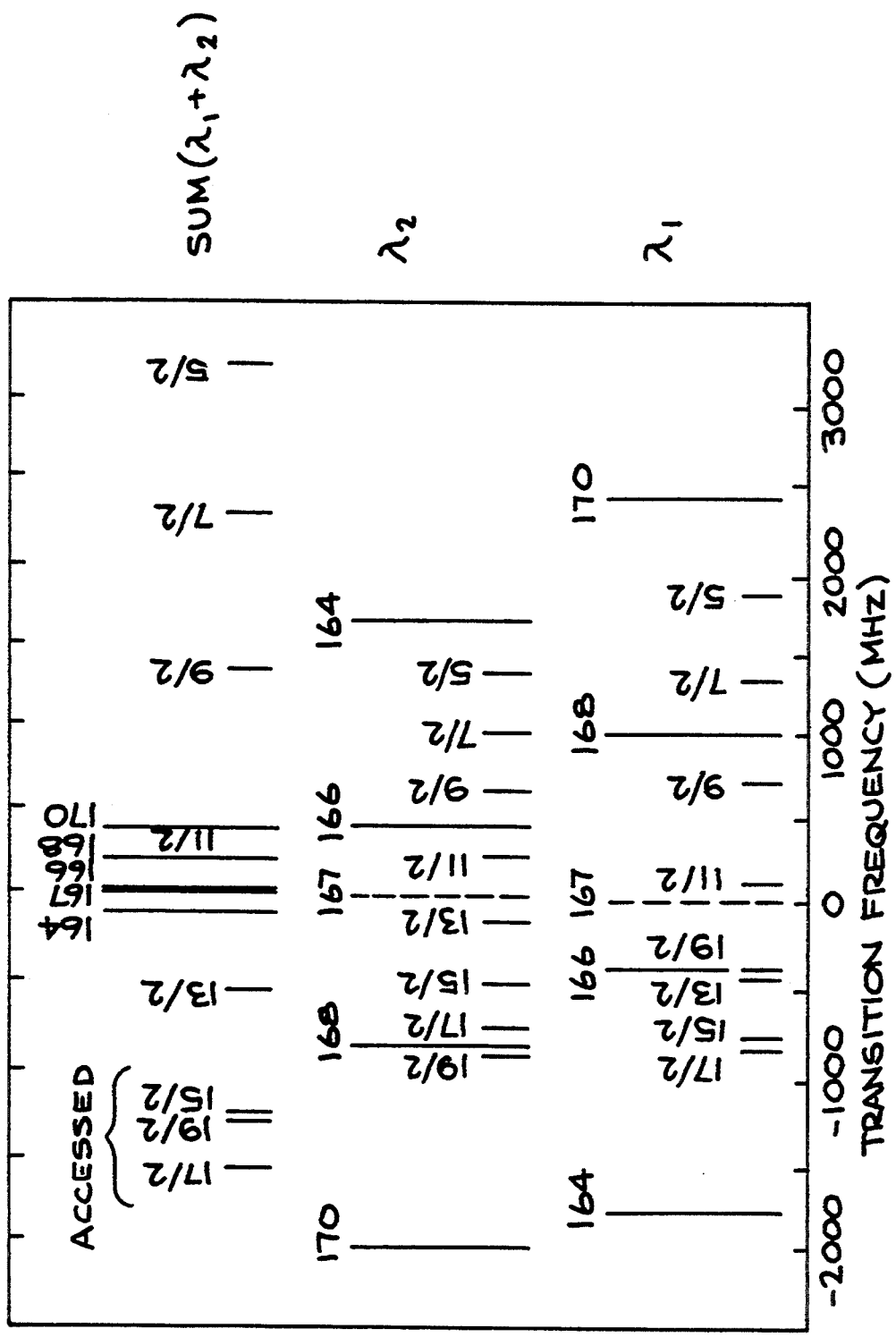
FIG. 1 shows the isotope shift and $^{167}$Er hyperfine structure for the first two steps, at $\lambda_1$ and $\lambda_2$, and the frequency sums for these steps ($\lambda_1+\lambda_2$), for the baseline photoionization pathway for $^{167}$Er.

The invention is a method for selectively photoionizing a desired isotope in an atomic vapor containing a plurality of isotopes by exciting the desired isotope along two or more photoionization pathways simultaneously, where each pathway comprises two or more transitions between energy levels. The method has been applied to erbium isotopes to enrich $^{167}$Er and to demonstrate the photoionization of a desired isotope along two excitation pathways. Applicants have found two three-step photoionization sequences involving the hyperfine structure of $^{167}$Er. These pathways can be used independently, but are preferably used in combination to efficiently photoionize more than half of the $^{167}$Er atoms in an erbium vapor in the AVLIS process.

Isotope separation may be performed in an AVLIS extractor, where a stream of atomic vapor is generated in an enclosed chamber. Typically, an electron gun heats a crucible containing liquid metal (or alloy) and vaporizes the metal. The stream of vapor is passed through a photoionization zone, where the vapor is exposed to laser beams of requisite energy and frequency. The laser beams selectively photoionize isotopes in the vapor, and the ions are withdrawn from the vapor by an applied electromagnetic field. The neutral atoms continue in the vapor stream to a separate condensation area. The ions are collected on a charged surface and neutralized to form a metal product enriched in the desired isotope. This general technique and apparatus for atomic vapor laser isotope separation are well known in the art.

Separation of Erbium Isotopes

The laser isotope separation of erbium isotopes is an example of combining two excitation pathways to enhance the selective photoionization process. The separation of even mass numbered isotopes of erbium, especially $^{164}$Er and $^{170}$Er, is possible by selecting transitions with suitable isotope shifts. However, the valuable odd mass numbered isotope, $^{167}$Er, has complicating hyperfine structure which, for most transitions, hinders the separation of the odd and even erbium isotopes. Because of the complex interactions between the nuclear magnetic moment and the magnetic field of the electrons, the selective photoionization of $^{167}$Er poses a difficult problem.

The applicants set certain criteria in selecting the best photoionization schemes for enriching $^{167}$Er. The energy levels, for example, had to be accessible given the laser frequency range and power of the available systems, and the lifetime of the levels had to be compatible (3 to 5 times longer) with the pulse width of the lasers. The applicants first investigated as potential photoionization pathways all the first and second step energy levels of $^{167}$Er that could be accessed by copper vapor laser pumped dye lasers.

Intensity data from an erbium hollow cathode discharge observed with a one meter Fourier transform spectrometer (FTS) were used to select candidates from the large number of energy levels (10 first step and 35 second step) for further evaluation. This process reduced the number of first step levels to three, and the number of second step levels to ten. A combination of photoionization investigations, hyperfine structure and isotope shift considerations, cross-section measurements, and a requirement for a common second step energy level resulted in two final three-step pathways: a baseline pathway and an alternate pathway. Other photoionization pathways were found, but had less satisfactory photoionization and selectivity.

FIG. 1 shows the isotope shift and $^{167}$Er hyperfine structure for the first two photoionization steps, $\lambda_1$ and $\lambda_2$, and the frequency sums for these steps ($\lambda_1+\lambda_2$) in the baseline photoionization pathway for $^{167}$Er. Hyperfine structure and isotope shift in lanthanides are visible only at very high resolution and result from the influence of the atomic nucleus on the energy levels of the atom. Hyperfine structure is created because the energy of atomic levels is slightly different for different (quantized) orientations between nuclear spin and angular momentum of the electrons.

Erbium-167 has a nuclear spin (I) of 7/2 and a ground state orbital angular momentum (J) of 6. For energy levels with J>I, each level has 2I+1 hyperfine levels with quantum numbers F from (J−I) to (J+I). The eight hyperfine levels of $^{167}$Er in the baseline excitation scheme are shown in FIG. 1 as short lines designated with the hyperfine quantum numbers (F=5/2 to 19/2). The long, solid vertical lines illustrate the relative transition frequencies for the even erbium isotopes: $^{162}$Er, $^{164}$Er, $^{166}$Er, $^{168}$Er, and $^{170}$Er. The center of gravity of $^{167}$Er is a weighted average of the hyperfine levels, and is set at zero for each wavelength, shown by a dotted line.

FIG. 1 illustrates how the hyperfine structure of $^{167}$Er effectively straddles the transition frequencies of $^{166}$Er and $^{168}$Er. In the baseline photoionization scheme, lasers are tuned to excite the 19/2, 17/2, and 15/2 $^{167}$Er transitions (52% of the $^{167}$Er population) using frequencies of −880 MHz for $\lambda_1$ and −740 MHz for $\lambda_2$, relative to the $^{167}$Er center of gravity. Fractions of the two nearest even isotopes ($^{164}$Er, $^{166}$Er) are excited in the first step ($\lambda_1$, −880 MHz), but not in the second step ($\lambda_2$, −740 Mttz). Therefore, by using these two photoionization steps at $\lambda_1$ and $\lambda_2$, the potentially interfering even isotopes, $^{164}$Er and $^{166}$Er, do not photoionize with $^{167}$Er.

Figure 2:
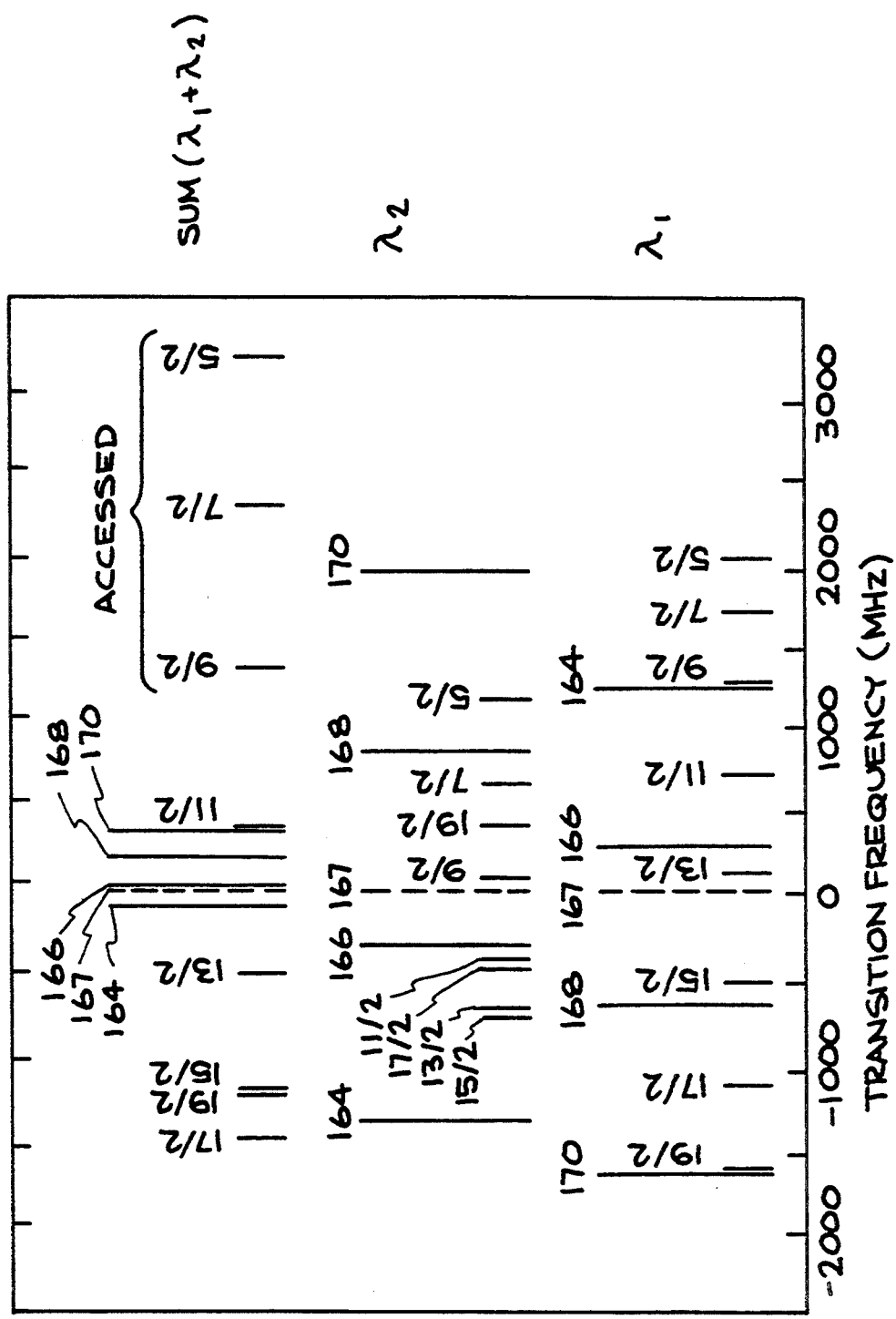
FIG. 2 shows the isotope shift and $^{167}$Er hyperfine structure for the first two steps, at $\lambda_1$ and $\lambda_2$, and the frequency sums for these steps ($\lambda_1+\lambda_2$), for the alternate photoinization pathway for $^{167}$Er.

FIG. 2 shows the isotope shift and $^{167}$Er hyperfine structure for the first two photoionization steps, $\lambda_1$ and $\lambda_2$, and the frequency sums for these steps ($\lambda_1+\lambda_2$) in the alternate photoionization pathway for $^{167}$Er. As in FIG. 1, the eight hyperfine levels of $^{167}$Er in the alternate excitation scheme are shown as short lines designated with the hyperfine quantum numbers (F=5/2 to 19/2). The long, solid vertical lines illustrate the relative transition frequencies for the even erbium isotopes, and the center of gravity of $^{167}$Er is set at zero and shown by a dotted line. The photoionization scheme using the alternate pathway accesses portions of the 9/2, 7/2, and 5/2 populations (23% of the $^{167}$Er population). In the first step, $\lambda_1$, the even erbium isotopes $^{164}$Er and $^{166}$Er may be photoionized with $^{167}$Er, but these isotopes are not photoionized in the second step, $\lambda_2$, and therefore are not present at the higher photoionization level.

Figure 3:
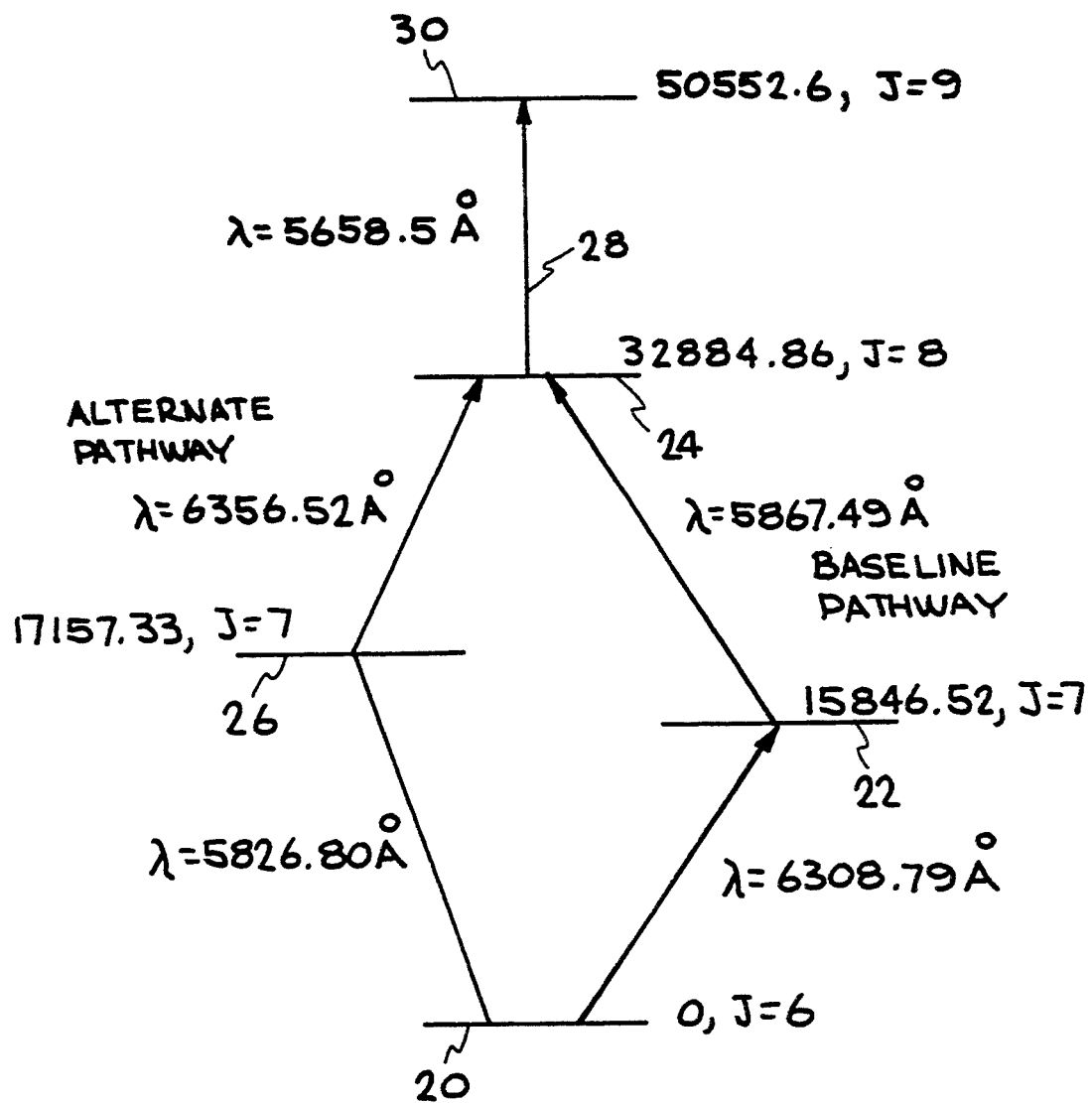
FIG. 3 is a schematic diagram of two excitation pathways used to enrich the isotope $^{167}$Er by laser irradiation of erbium vapor.

FIG. 3 shows a schematic diagram of the two three-step pathways found for $^{167}$Er enrichment and some of the important spectroscopic properties. In the present method, the erbium vapor, containing a plurality of erbium isotopes, is exposed to laser-produced radiant energy, preferably from copper vapor laser pumped dye lasers or Nd:YAG laser pumped dye lasers. The separation can be accomplished using either polarized or unpolarized lasers. Although the baseline and alternate pathways can be used independently, the pathways are typically used in combination. A set of five laser beams is used to excite the five transitions between the baseline and alternate photoionization pathways simultaneously.

The energy and frequency of the first laser beam is sufficient to excite the $^{167}$Er atoms from the natural ground state 20 to a first excited state 22 for a J=6→7 transition. Given the ground state 20 energy is zero, the first excited state 22 in the baseline pathway has an energy of 15846 cm$^{-1}$. A second laser beam irradiates the vapor with energy sufficient to excite the $^{167}$Er atoms from the first excited state 22 to a second excited state 24 having an energy of 32884 cm$^{-1}$ and J=8. Both the baseline and alternate pathways share this second excited state 24.

The third laser beam is used for the alternate pathway and has an energy and frequency sufficient to excite the $^{167}$Er atoms from the ground state 20 to a first excited state 26 at an energy level of 17157 cm$^{-1}$. The fourth laser beam excites the $^{167}$Er atoms in the first excited state 26 to a second excited state 24 at 32884 cm$^{-1}$ that is shared by the baseline pathway.

The final transition 28 for both the baseline and alternate pathways is completed using the fifth laser beam having an energy and frequency sufficient to excite the $^{167}$Er atoms from the common second excited state 24 to an autoionizing state 30 having an energy of 50552 cm$^{-1}$ and J=9. This transition 28 may be substituted with another autoionizing state; the first two transitions of the baseline and alternate pathways are the most critical in selectively ionizing $^{167}$Er.

The use of two separate excitation pathways has the advantage that each one can access a different subset of the eight hyperfine structure levels to increase the fraction of $^{167}$Er atoms photoionized. The use of a common second excited state has added advantages in simplification of the laser architecture. The wavelength pairs 5826 Å and 5867 Å, and 6308 Å and 6356 Å, shown in FIG. 3, can be amplified using two, rather than four, dye laser amplifier systems. The common last step provides further simplification by the use of only one oscillator-amplifier system, rather than two. The term "beam" is defined here as a ray of light with a given frequency or wavelength, and several rays or beams may be amplified in one system.

The baseline and alternate photoionization schemes for $^{167}$Er, as well as other spectroscopic parameters for the two pathways, are shown in Table 1 and Table 2. With the exception of g-factors, the ground state hyperfine structure A and B constants, and the first and second level energies, all the values in the tables were found experimentally by the applicants and used to determine suitable pathways.

The foregoing description of preferred embodiments of the invention is presented for purposes of illustration and description and is not intended to be exhaustive or to limit the invention to the precise form disclosed. The scope of the invention is to be defined by the following claims.

TABLE 1

Spectroscopic parameters for the baseline photoionization pathway for enrichment of the $^{167}$Er isotope in erbium vapor

| $^{167}$Er energy (cm$^{-1}$) | J → J$_u$ | λ (Å) | σ (cm$^2$ × 10$^{-14}$) | g-factor | Lifetime τ (ns) | hfs constants $^{167}$Er A (MHz) | B (MHz) | Transition isotope shifts (MHz)* 164 | 166 | 168 | 170 |
|---|---|---|---|---|---|---|---|---|---|---|---|
| 0 | 6 | | | 1.16381 | — | −120.487 | −4552.984 | | | | |
| | | 6308.79 | 3.0(7) | | | | | −1772 | −392 | +1004 | +2439 |
| 15846.52 | 7 | | | 1.070 | 4900(1000) | −140.4(4) | −2505(2) | | | | |
| | | 5867.49 | 3.2(5) | | | | | +1669 | +425 | −820 | −2088 |
| 32884.86 | 8 | | | 1.145 | 445(80) | −159.3(2) | −1915(8) | | | | |
| | | 5658.5 | 4.4(7) | | | | | −126 | −32 | +61 | +158 |
| 50552.6 | 9 | | | | 0.12(4) | −111(2) | −2263(100) | | | | |

*Frequency relative to center of gravity of $^{167}$Er isotope.
Values in parenthesis are the uncertainties in the last digit(s).

TABLE 2

Spectroscopic parameters for an alternate photoionization pathway for laser enrichment of the $^{167}$Er isotope in erbium vapor

| $^{167}$Er energy (cm$^{-1}$) | $J \to J_u$ | Wavelength, cross section λ (Å) | σ (cm$^2$ × 10$^{-14}$) | g-factor | Lifetime τ (ns) | hfs constants $^{167}$Er A (MHz) | B (MHz) | Transition isotope shifts (MHz)* 164 | 166 | 168 | 170 |
|---|---|---|---|---|---|---|---|---|---|---|---|
| 0 | 6 | | | 1.16381 | — | −120.487 | −4552.984 | | | | |
| | | 5826.80 | 13(3) | | | | | +1268 | +331 | −643 | −1643 |
| 17157.33 | 7 | | | 1.195 | 856(77) | −172.5(6) | −4440(4) | | | | |
| | | 6356.52 | 0.88(18) | | | | | −1371 | −298 | +827 | +1994 |
| 32884.86 | 8 | | | 1.145 | 445(80) | −159.3(2) | −1915(8) | | | | |
| | | 5658.5 | 4.4(7) | | | | | −126 | −32 | +61 | +158 |
| 50552.6 | 9 | | | | 0.12(4) | −111(2) | −2263(100) | | | | |

*Frequency relative to center of gravity of $^{167}$Er isotope.
Values in parenthesis are the uncertainties in the last digit(s).

We claim:

1. A method for enhancing the selective ionization of a desired isotope in an atomic vapor containing a plurality of isotopes using laser-produced radiant energy, comprising:

(a) selecting at least two photoionization pathways of the desired isotope, wherein each pathway comprises two or more transitions between at least three energy levels, including a ground state, and wherein each pathway will selectively photoionize the desired isotope; and (b) applying to the atomic vapor at least four beams of laser-produced radiant energy having energy sufficient to excite the atoms of the desired isotope from lower energy levels to higher energy levels in the two or more pathways, whereby the desired isotope is photoionized along the two or more pathways simultaneously.

2. The method as recited in claim 1, wherein step (a) further comprises:

selecting two pathways, wherein each pathway comprises three or more transitions between four or more energy levels, and wherein an upper energy level is shared by the two pathways; and wherein step (b) further comprises:

applying at least five beams to the atomic vapor to excite the five or more transitions in the two pathways, whereby the desired isotope is photoionized along the two pathways simultaneously.

3. The method as recited in claim 2, wherein the desired isotope is $^{167}$Er, and step (b) further comprises:

(1) applying a first beam having energy sufficient to excite the $^{167}$Er atoms from the ground state having an orbital angular momentum (J) of 6 to a baseline first excited state of J=7 at an energy level of 15846.52 cm$^{-1}$ relative to the zero energy of the ground state;

(2) applying a second beam having energy sufficient to excite the $^{167}$Er atoms in the baseline first excited state to a second excited state of J=8 at an energy level of 32884.86 cm$^{-1}$ relative to the zero energy of the ground state;

(3) applying a third beam having energy sufficient to excite the $^{167}$Er atoms from the ground state having an orbital angular momentum (J) of 6 to an alternate first excited state of J=7 at an energy level of 17157.33 cm$^{-1}$ relative to the zero energy of the ground state;

(4) applying a fourth beam having energy sufficient to excite the $^{167}$Er atoms in the alternate first excited state to the second excited state; and (5) applying a fifth beam having energy sufficient to excite the $^{167}$Er atoms in the second excited state to an autoionizing state.

4. The method as recited in claim 3, wherein each beam originates from a dye laser, and wherein the first beam is tuned to a wavelength of 6308.79 Å, the second beam is tuned to a wavelength of 5867.49, the third beam is tuned to a wavelength of 5826.80 Å, and the fourth beam is tuned to a wavelength of 6356.52 Å.

5. The method as recited in claim 3, wherein the autoionizing state in step (5) is at an energy level of 50552.6 cm$^{-1}$ relative to the zero energy of the ground state.

6. The method as recited in claim 3, wherein the autoionizing state in step (5) has an orbital angular momentum (J) of 9.

7. The method as recited in claim 5, wherein the fifth beam originates from a dye laser tuned to a wavelength of 5658.5 Å.

8. The method as recited in claim 3, wherein step (b) further comprises:

(i) amplifying the first and fourth beams in a first dye laser amplifier system; and (ii) amplifying the second and third beams in a second dye laser amplifier system.

9. A method for selective ionization of an erbium isotope of atomic mass 167 in an atomic vapor containing a plurality of erbium isotopes, comprising:

(a) applying to the atomic vapor a first beam of laser-produced radiant energy sufficient to excite the $^{167}$Er atoms from a ground state having an orbital angular momentum (J) of 6 to a first excited state of J=7 at an energy level of 15846.52 cm$^{-1}$ relative to the zero energy of the ground state;

(b) applying to the atomic vapor a second beam of laser-produced radiant energy sufficient to excite the $^{167}$Er atoms in the first excited state to a second excited state of J=8 at an energy level of 32884.86 cm$^{-1}$ relative to the zero energy of the ground state; and (c) applying to the atomic vapor a third beam of laser-produced radiant energy sufficient to excite the $^{167}$Er atoms in the second excited state to an autoionizing state.

10. The method as recited in claim 9, wherein the first beam originates from a dye laser tuned to a wavelength of 6308.79 Å, and wherein the second beam originates from a dye laser tuned to a wavelength of 5867.49 Å.

11. The method as recited in claim 9, wherein the autoionizing state in step (c) is at an energy level of 50552.6 cm$^{-1}$ relative to the zero energy of the ground state.

12. The method as recited in claim 9, wherein the autoionizing state in step (c) has an orbital angular momentum (J) of 9.

13. The method as recited in claim 9, wherein the third beam originates from a dye laser tuned to a wavelength of 5658.5 Å.

14. A method for selective ionization of an erbium isotope of atomic mass 167 in an atomic vapor containing a plurality of erbium isotopes, comprising:
(a) applying to the atomic vapor a first beam of laser-produced radiant energy sufficient to excite the $^{167}$Er atoms from a ground state having an orbital angular momentum (J) of 6 to a first excited state of J=7 at an energy level of 17157.33 cm$^{-1}$ relative to the zero energy of the ground state;
(b) applying to the atomic vapor a second beam of laser-produced radiant energy sufficient to excite the $^{167}$Er atoms in the first excited state to a second excited state of J=8 at an energy level of 32884.86 cm$^{-1}$ relative to the zero energy of the ground state; and
(c) applying to the atomic vapor a third beam of laser-produced radiant energy sufficient to excite the $^{167}$Er atoms in the second excited state to an autoionizing state.

15. The method as recited in claim 14, wherein the first beam originates from a dye laser tuned to a wavelength of 5826.80 Å, and wherein the second beam originates from a dye laser tuned to a wavelength of 6356.52 Å.

16. The method as recited in claim 14, wherein the autoionizing state in step (c) is at an energy level of 50552.6 cm$^{-1}$ relative to the zero energy of the ground state.

17. The method as recited in claim 14, wherein the autoionizing state in step (c) has an orbital angular momentum (J) of 9.

18. The method as recited in claim 14, wherein the third beam originates from a dye laser tuned to a wavelength of 5658.5 Å.

* * * * *